US008643722B2

(12) United States Patent  (10) Patent No.: US 8,643,722 B2
Solida  (45) Date of Patent: Feb. 4, 2014

(54) REAR-VIEW DISPLAY SYSTEM FOR A BICYCLE

(75) Inventor: Evan Solida, Mauldin, SC (US)

(73) Assignee: Cerevellum Design, LLC, Greenville, SC (US)

( * ) Notice: Subject to any disclaimer, the term of this patent is extended or adjusted under 35 U.S.C. 154(b) by 501 days.

(21) Appl. No.: 12/729,408

(22) Filed: Mar. 23, 2010

(65) Prior Publication Data

US 2010/0171832 A1 Jul. 8, 2010

Related U.S. Application Data

(63) Continuation-in-part of application No. 12/338,630, filed on Dec. 18, 2008.

(60) Provisional application No. 61/103,637, filed on Oct. 8, 2008.

(51) Int. Cl.
H04N 7/18 (2006.01)

(52) U.S. Cl.
USPC .......................................... 348/148; 348/158

(58) Field of Classification Search
USPC .................................................. 348/148, 158
See application file for complete search history.

(56) References Cited

U.S. PATENT DOCUMENTS

| | | | |
|---|---|---|---|
| 490,750 A | 1/1893 | Kuhn |
| 704,771 A | 7/1902 | Bailey |
| D213,082 S | 12/1968 | Walker |
| 3,598,295 A | 8/1971 | Seegers |
| 3,768,433 A | 10/1973 | Dian et al. |
| D247,292 S | 2/1978 | Brown |
| 4,135,788 A | 1/1979 | Sargis |
| 4,277,804 A | 7/1981 | Robinson |
| 4,380,369 A | 4/1983 | Schacht |
| 4,541,555 A | 9/1985 | Miree |
| 4,623,954 A | 11/1986 | Schott et al. |
| 4,637,605 A | 1/1987 | Ritchie |
| 4,662,547 A | 5/1987 | Villanueva et al. |
| 4,715,681 A | 12/1987 | Johnson |
| 4,716,502 A | 12/1987 | Schott et al. |
| 4,756,454 A | 7/1988 | Villanueva et al. |
| 4,779,169 A | 10/1988 | Cruze |
| 4,826,306 A | 5/1989 | Grissen et al. |
| 4,875,142 A | 10/1989 | Spector |
| 4,881,187 A | 11/1989 | Read |

(Continued)

OTHER PUBLICATIONS www.radioshack.com Printout re: Memsic 2125 Dual Axis Accelerometer, 3 pgs.

(Continued)

*Primary Examiner* — Lynn Feild
*Assistant Examiner* — Lin Liu
(74) *Attorney, Agent, or Firm* — McNair Law Firm, P.A.; Douglas W. Kim (57) ABSTRACT

A display system for a bicycle is disclosed that comprises a camera selectively attachable to the bicycle and a display unit fixable to the handlebars of the bicycle. The camera includes a power source and a signaling means adapted for sending visual scene information from the camera, either wirelessly or through a plurality of conductive cables. The display unit includes a display means, a power source, and a signal receiving means. The signal receiving means is adapted for receiving the visual scene information of the signaling means so that the display unit may display the visual scene information on the display means.

14 Claims, 5 Drawing Sheets

(56) References Cited

U.S. PATENT DOCUMENTS

| | | | |
|---|---|---|---|
| 4,913,581 A * | 4/1990 | Weiler | 404/117 |
| 4,981,243 A | 1/1991 | Rogowski | |
| 5,172,321 A | 12/1992 | Ghaem et al. | |
| 5,243,417 A | 9/1993 | Pollard | |
| 5,243,528 A | 9/1993 | Lefebvre | |
| 5,247,431 A | 9/1993 | Liu | |
| D345,534 S | 3/1994 | Abboud et al. | |
| 5,355,746 A | 10/1994 | Lin | |
| 5,370,412 A | 12/1994 | Chou | |
| 5,450,325 A | 9/1995 | Rodriguez | |
| 5,457,612 A | 10/1995 | Carter | |
| 5,467,906 A | 11/1995 | Forman | |
| D365,073 S | 12/1995 | Nagano | |
| D370,193 S | 5/1996 | Shull | |
| 5,563,742 A | 10/1996 | Menz | |
| 5,580,152 A | 12/1996 | Carter | |
| 5,621,382 A | 4/1997 | Yamamoto | |
| 5,625,336 A | 4/1997 | Yamamoto | |
| D381,711 S | 7/1997 | Englert | |
| 5,644,439 A | 7/1997 | Shiba | |
| 5,760,828 A | 6/1998 | Cortes | |
| D396,835 S | 8/1998 | Roddy | |
| 5,826,925 A | 10/1998 | Marx | |
| 5,847,641 A | 12/1998 | Jinbo | |
| 5,903,214 A | 5/1999 | Watarai | |
| 5,950,498 A | 9/1999 | Gossett et al. | |
| 6,004,243 A | 12/1999 | Ewert | |
| D419,123 S | 1/2000 | Okuda | |
| 6,023,646 A | 2/2000 | Kubacsi et al. | |
| 6,069,788 A | 5/2000 | Masui | |
| 6,084,506 A | 7/2000 | Irie | |
| 6,151,065 A | 11/2000 | Steed et al. | |
| D436,898 S | 1/2001 | Okada | |
| 6,175,300 B1 | 1/2001 | Kendrick | |
| 6,192,300 B1 | 2/2001 | Watarai et al. | |
| 6,204,752 B1 * | 3/2001 | Kishimoto | 340/432 |
| D443,562 S | 6/2001 | Okada | |
| 6,281,674 B1 | 8/2001 | Huang | |
| 6,293,449 B1 * | 9/2001 | McGuire et al. | 224/420 |
| 6,305,241 B1 | 10/2001 | Masui et al. | |
| 6,308,590 B1 | 10/2001 | Berto | |
| 6,328,190 B1 | 12/2001 | Lohr | |
| 6,328,268 B1 | 12/2001 | Irie | |
| 6,331,089 B1 | 12/2001 | Iteya | |
| D453,716 S | 2/2002 | Iteya et al. | |
| 6,357,882 B1 | 3/2002 | Whittingdale | |
| 6,388,871 B1 | 5/2002 | Masui | |
| 6,394,021 B1 | 5/2002 | Caron et al. | |
| 6,442,505 B1 | 8/2002 | Lee | |
| 6,446,922 B2 | 9/2002 | Irie | |
| 6,490,507 B1 | 12/2002 | Campagnolo | |
| 6,557,437 B2 | 5/2003 | Masui et al. | |
| 6,584,872 B1 | 7/2003 | Kojima | |
| 6,634,758 B2 | 10/2003 | Preis et al. | |
| 6,693,519 B2 | 2/2004 | Keirstead | |
| 6,722,679 B2 | 4/2004 | Englert | |
| D490,028 S | 5/2004 | Orsini | |
| 6,805,473 B2 | 10/2004 | Beard | |
| 6,834,565 B2 | 12/2004 | Cohen et al. | |
| 6,834,972 B1 | 12/2004 | Medimure | |
| 6,918,860 B1 | 7/2005 | Nusbaum | |
| 6,945,441 B2 | 9/2005 | Gates et al. | |
| D514,033 S | 1/2006 | Jacklyn, II | |
| 7,030,778 B2 | 4/2006 | Ra | |
| 7,044,891 B1 | 5/2006 | Rivera | |
| D528,451 S | 9/2006 | Cunningham et al. | |
| 7,111,968 B2 | 9/2006 | Bauer et al. | |
| 7,127,965 B2 | 10/2006 | Chuang | |
| 7,132,931 B2 | 11/2006 | Okada | |
| 7,200,447 B2 | 4/2007 | Campagnolo et al. | |
| D552,516 S | 10/2007 | Files | |
| 7,353,086 B2 | 4/2008 | Ennis | |
| 7,365,300 B2 | 4/2008 | Angell et al. | |
| 7,504,965 B1 * | 3/2009 | Windover et al. | 340/937 |
| 2001/0027495 A1 | 10/2001 | Campagnolo | |
| 2001/0031682 A1 | 10/2001 | Auer et al. | |
| 2001/0039850 A1 | 11/2001 | Masui et al. | |
| 2001/0040204 A1 | 11/2001 | Irie | |
| 2002/0020249 A1 | 2/2002 | Darland et al. | |
| 2002/0069813 A1 | 6/2002 | Caron et al. | |
| 2002/0077221 A1 | 6/2002 | Dalebout et al. | |
| 2002/0080016 A1 | 6/2002 | Keirstead | |
| 2002/0127907 A1 | 9/2002 | Nishimoto | |
| 2002/0175999 A1 | 11/2002 | Mutobe et al. | |
| 2002/0194945 A1 | 12/2002 | Greetis | |
| 2003/0072093 A1 | 4/2003 | Reis et al. | |
| 2003/0090568 A1 | 5/2003 | Pico | |
| 2004/0017286 A1 | 1/2004 | Takeda | |
| 2004/0150589 A1 | 8/2004 | Mizusawa | |
| 2004/0189722 A1 * | 9/2004 | Acres | 345/866 |
| 2004/0239489 A1 | 12/2004 | Takeda | |
| 2004/0246602 A1 | 12/2004 | McGuinnessw | |
| 2005/0040939 A1 | 2/2005 | Jobes et al. | |
| 2005/0178235 A1 | 8/2005 | Okada | |
| 2005/0180150 A1 | 8/2005 | Okada et al. | |
| 2005/0195128 A1 | 9/2005 | Sefton | |
| 2005/0221960 A1 | 10/2005 | Miyamaru et al. | |
| 2006/0146552 A1 * | 7/2006 | Shaffer | 362/465 |
| 2006/0208023 A1 | 9/2006 | Manning | |
| 2006/0232389 A1 | 10/2006 | Chu | |
| 2007/0064008 A1 | 3/2007 | Childers | |
| 2007/0068332 A1 | 3/2007 | Fujii et al. | |
| 2007/0160364 A1 | 7/2007 | Peika | |
| 2007/0170338 A1 | 7/2007 | Ueda et al. | |
| 2007/0179632 A1 | 8/2007 | Campagnolo et al. | |
| 2007/0182817 A1 | 8/2007 | Briggance | |
| 2007/0221694 A1 | 9/2007 | Aguiliar et al. | |
| 2008/0158352 A1 | 7/2008 | Schmidt et al. | |
| 2008/0239080 A1 * | 10/2008 | Moscato | 348/148 |

OTHER PUBLICATIONS

Cerevellum Brochure, re: Rear-View Mirror for Bicycles, 2009, 4 pgs.

U.S. Appl. No. 12/338,630, filed Dec. 2008, Solida.

* cited by examiner

REAR-VIEW DISPLAY SYSTEM FOR A BICYCLE

CROSS-REFERENCE TO RELATED APPLICATIONS

This application is a continuation-in-part of pending U.S. application Ser. No. 12/338,630 filed Dec. 18, 2008 which claims the benefit of expired U.S. Provisional Patent Application 61/103,637, filed on Oct. 8, 2008, both of which are incorporated herein by reference.

FIELD OF THE INVENTION

This invention relates to bicycle accessories, and more particularly to a bicycle-mounted camera and display system.

DISCUSSION OF RELATED ART

With public roads becoming more and more crowded everyday, using a rear view mirror for safety is more important than ever. Using such a mirror allows for the rider to easily view what is behind them at all times without the dangerous maneuver of turning around. When turning around on a bike to view what is approaching from behind, the rider must pivot his body around his hips, thus changing the grip applied to the handlebars. As such riders can drift dangerously towards the edge of the road or into traffic. Additionally, the rider must take his eyes off the road ahead for a few seconds. Those precious seconds could be the time needed to avoid a possible accident with oncoming traffic or hazards.

The use of traditional bicycle mirrors has some disadvantages. Traditionally, use of rearview bicycle mirrors has been stigmatized, and as such more serious cyclists fail to use bicycle mirrors. Also, because traditional mirrors must be mounted to the outside of the rider's profile, they can contact a tree, fence or other object, sending the rider out of control. Moreover, if riding on a public bicycle path, such a mirror can seriously injure passing pedestrians. Finally, handlebar-mounted mirrors are on the outer-edge of the cyclist's profile and as such are more susceptible to impact with objects during turns. Therefore, a need exists for a device that provides a rider a rear view without extending unsafely beyond the outer-edge of the bicycle.

One solution provided in U.S. Pat. No. 6,634,758 to Preis et al. on Oct. 21, 2003 teaches placing mirrors inside the handlebars of a bicycle. Mirrors that attach to the end of handlebars, like traditional mirrors, suffer from blurred images caused by road vibration. Moreover, the use of mirrors inside the handlebars, while safer, provides a smaller viewing area than traditional mirrors. Therefore, a need exists for a device that provides a stable, clear, and large view of the area behind the rider.

One option is to use a camera and display system, instead of using mirrors. A camera and display systems avoids the problem of needing to see around or through the rider. Instead, a camera mounted behind the rider can capture and transmit an image to a display mounted in front of the rider. Also, depending on the camera system used, the problem of vibration affecting image quality can be reduced. Several prior art patents teach this general concept for motorcycles and bicycles. U.S. Pat. No. 5,243,417 to Pollard on Sep. 7, 1993 teaches a rear vision system for two-wheeled vehicles with movable handlebars. U.S. Pat. No. 7,353,086 to Ennis on Apr. 1, 2008 teaches a system and method for providing a rear view of a motorcycle. US Patent Application 2006/0232389 to Chu published on Oct. 19, 2006 teaches a rotating monitoring apparatus for vehicles including bicycles.

However, despite the development of many approaches to camera and display systems, these approaches have significant drawbacks. The greatest drawback is that these devices teach attaching a camera to the exterior of the vehicle or bicycle. While this type of camera is convenient to install, additional weight and wind resistance is added to the bicycle. The additional weight and wind resistance are significant problems, as bicycles are often used for racing and these factors have a negative impact on performance. Therefore, a need exists for a rear view display system for bicycles that minimizes the weight of the camera used and minimizes the negative effect of wind resistance by incorporating the camera directly into the bicycle.

Traveling by bicycle is almost always on surfaces designed for use by motor vehicles. The surface is typically rough and the thin tires required for reasonable bicycle efficiency are not well equipped for pot-holes, expansion joints and the like. Furthermore, the path of travel is often along the edge of the road which creates many problems including surface undulations, limited width of travel lane and the small relative visual target afforded by a person on a bicycle. It is difficult for a camera to capture images which are not blurry under these conditions. This has lead to the limited use of optics on bicycles.

A particular problem associated with travel on a bicycle is the constant risk of wrecks. Reconstruction of a collision between a bicycle and a motor vehicle is often difficult due to the lack of visible evidence, such as tire marks, left by a bicycle. There has been a long felt need for a system for recording a period of time such as the time leading up to, and including, a collision, or a method of simply recording the memories of a ride.

Consequently, there is a need for a rear view display system for bicycles that provides a rider with a rear view without extending unsafely beyond the outer-edge of the bicycle. Such a needed device would provide a stable, clear, and relatively large view of the area behind the rider. Further, the needed device would minimize the weight of the camera used and minimize the negative effect of wind resistance by incorporating the camera directly into the bicycle. The present invention accomplishes these objectives.

SUMMARY OF THE INVENTION

The present device is a display system for a bicycle that comprises a camera that is selectively attachable to the bicycle. The camera includes a power source and a signaling means adapted for sending visual scene information from the camera.

In a preferred embodiment, the camera is fixed within a seat post that has a lower end adapted for engagement with the seat post receptacle of the bicycle and an upper end of the seat post that is adapted for engagement with the seat of the bicycle. The seat post includes the camera alignable with the longitudinal axis of the bicycle and facing rearwardly.

The display system further includes a display unit adapted for engagement with the handlebars of the bicycle. The display unit includes a display means, a power source, and a signal receiving means. The signal receiving means is adapted for receiving the visual scene information of the signaling means so that the display unit may display the visual scene information on the display means.

In a first embodiment of the invention, the signaling means is a wireless signaling means. As such, the signal receiving means of the display unit is a cooperating wireless signal receiving means adapted to receive the radio or infrared signal of the wireless signal transmitter. In a second embodiment of the invention, the signaling means of the camera and the signal receiving means of the display unit is at least one conductive cable electrically connecting the camera to the display unit.

The present invention is a device that gives a bicycle rider a rear view without extending unsafely beyond the outer-edge of the bicycle. The invention provides a stable, clear, and relatively large view of the area behind the rider. Further, the present device includes a camera that minimizes the negative effect of wind resistance and minimizes the weight of the camera used by incorporating the camera directly into the bicycle. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the display system of the present invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
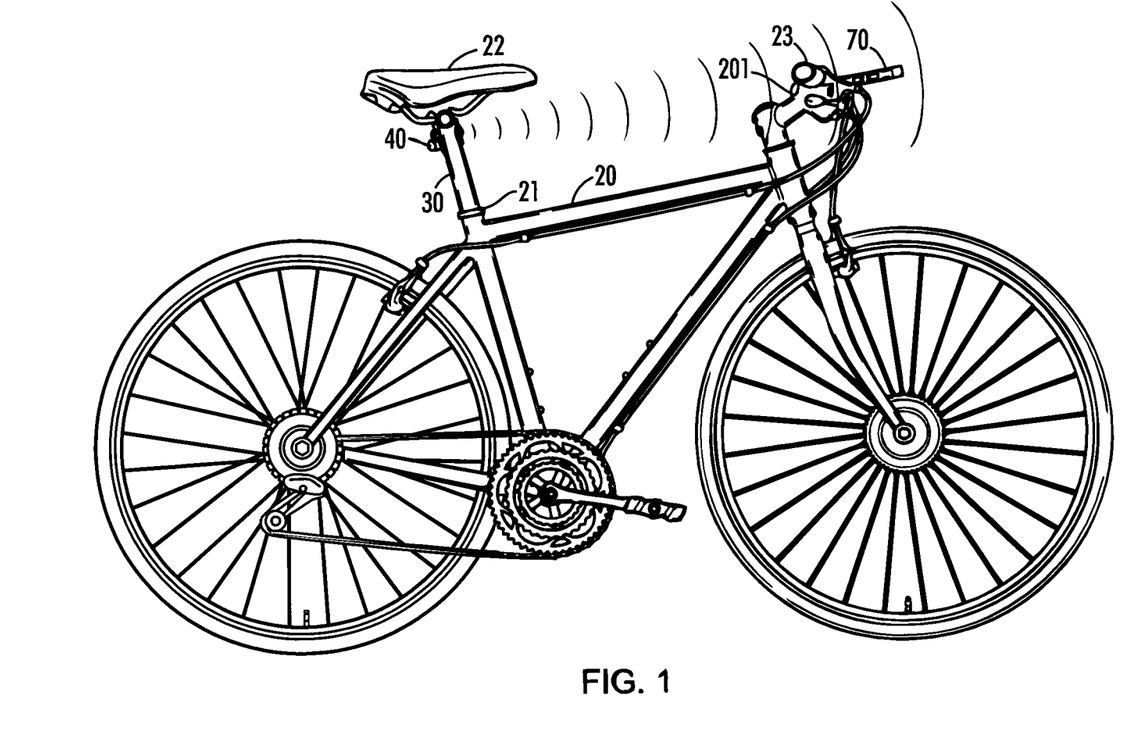
FIG. 1 is a right side elevational view of a first embodiment of the invention, as used with a bicycle.
Figure 6:
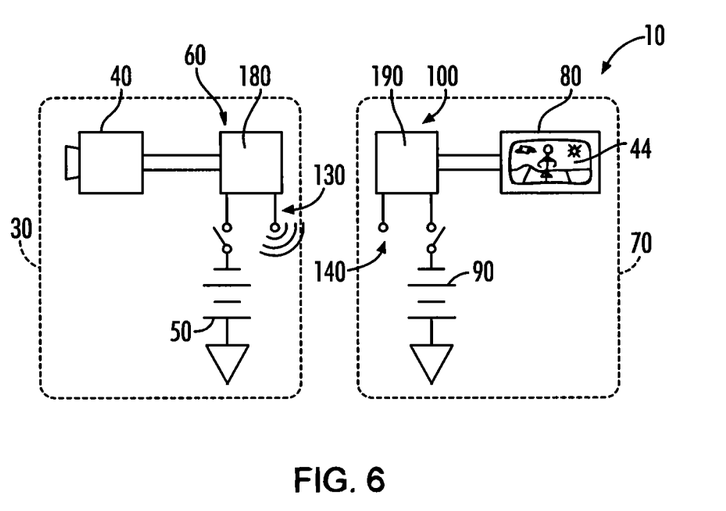
FIG. 6 is a functional block diagram of the first embodiment of the invention.

FIGS. 1 and 6 illustrate a display system 10 for a bicycle 20 that has a seat post receptacle 21, a seat 22, and handlebars 23. The display system 10 comprises a camera 40 that is selectively attachable to the bicycle 20. The camera 40 includes a power source 50 and a signaling means 60 adapted for sending visual scene information 44 from the camera 40. Such visual scene information 44 is typically a rear-view of the scene behind a rider (not shown) of the bicycle 20.

Figure 2:
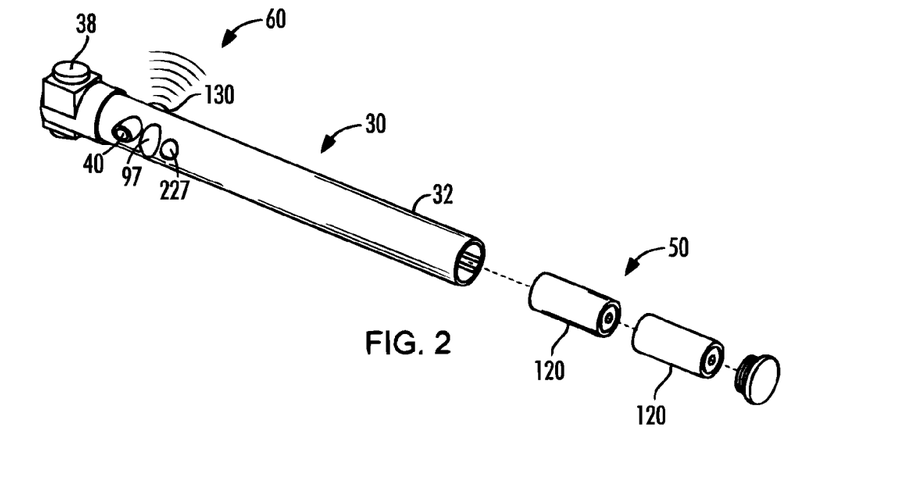
FIG. 2 is an exploded perspective view of a seat post thereof.

In a preferred embodiment, the camera 40 is fixed within a seat post 30 that has a lower end 32 adapted for engagement with the seat post receptacle 21 of the bicycle 20 (FIG. 2) and an upper end 38 of the seat post 30 that is adapted for engagement with the seat 22 of the bicycle 20. The seat post 30 includes the camera 40 alignable with the longitudinal axis of the bicycle 20 and facing rearwardly. In another embodiment the camera may be facing forward to allow recordation of a ride. The power source 50 is preferably at least one battery 120 fixed within the seat post 30 and adapted to power the camera 40 and the signaling means 60. An illumination device 97 can be adapted to provide light to enhance the image or an LED to increase visibility of the bicycle, particularly, during night travel. An LED, particularly a red LED, is preferred to increase visibility. The LED can be constantly illuminated or, more preferably, strobing.

In an alternate embodiment of the invention, the camera 40 includes a clip (not shown) for selectively fixing the camera 40 to the seat 22 of the bicycle 20, the seat post 30, or the like. Alternately, the camera 40 may be mounted into either end of the handlebars 23 (not shown). Alternate camera 40 mounting means may also be included, such as incorporating the camera 40 into a reflector mount (not shown), attaching the camera 40 to seat stay members (not shown) or the rear end of the seat or saddle (not shown).

Figure 3:
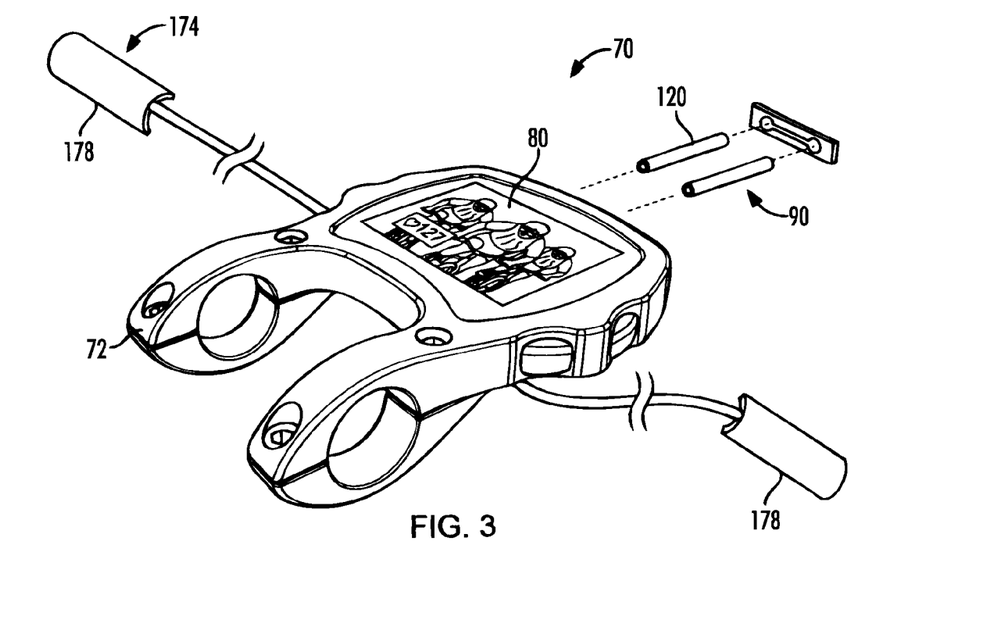
FIG. 3 is an exploded perspective view of a display unit thereof.

A display unit 70 (FIGS. 3 and 5) is adapted for engagement with the handlebars 23 of the bicycle 20. The display unit 70 includes a display means 80, a power source 90, and a signal receiving means 100. The signal receiving means 100 is adapted for receiving the visual scene information 44 of the signaling means 60 so that the display unit 70 may display the visual scene information 44 on the display means 80. The power source 90 is preferably at least one of the batteries 120 fixed within the display unit 70 and adapted to power the display means 80 and the signal receiving means 100. The display means 80 may be a liquid crystal display, an organic light-emitting diode display, or the like.

In a first embodiment of the invention, illustrated in FIGS. 1 and 6, the signaling means 60 is a wireless signaling means 130, such as a radio or infrared signaling transmitter 180 utilizing Garmin's ANT+Sport wireless protocol, for example. As such, the signal receiving means 100 of the display unit 70 is a cooperating wireless signal receiving means 140, such as a radio or infrared signal receiver 190, adapted to receive the radio or infrared signal of the wireless signal transmitter 180. In such an embodiment, the camera 40 includes its own power source 50, separate from the power source 90 of the display unit 70.

Figure 4:
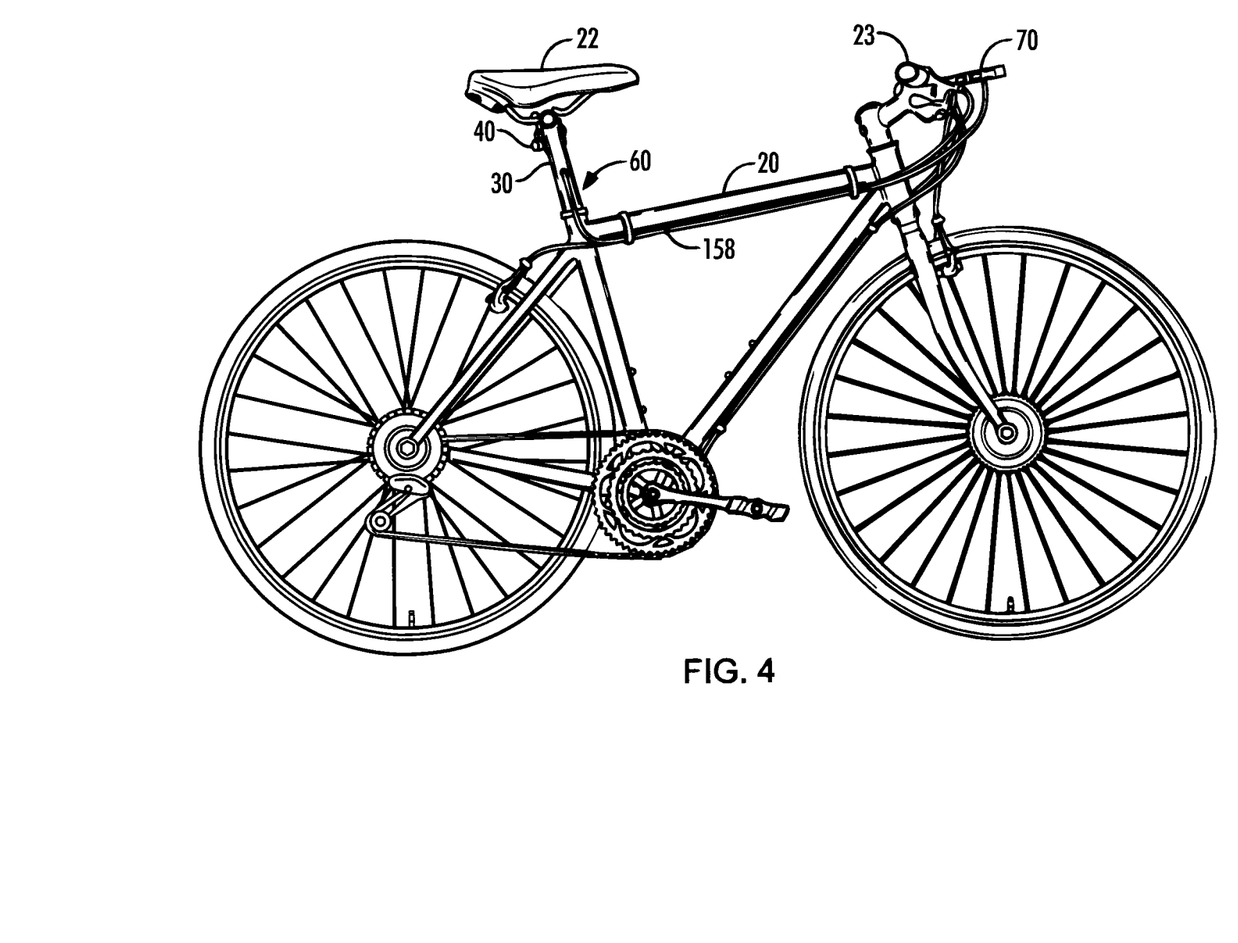
FIG. 4 is a right-side elevational view of a second embodiment of the invention, as used with a bicycle.
Figure 7:
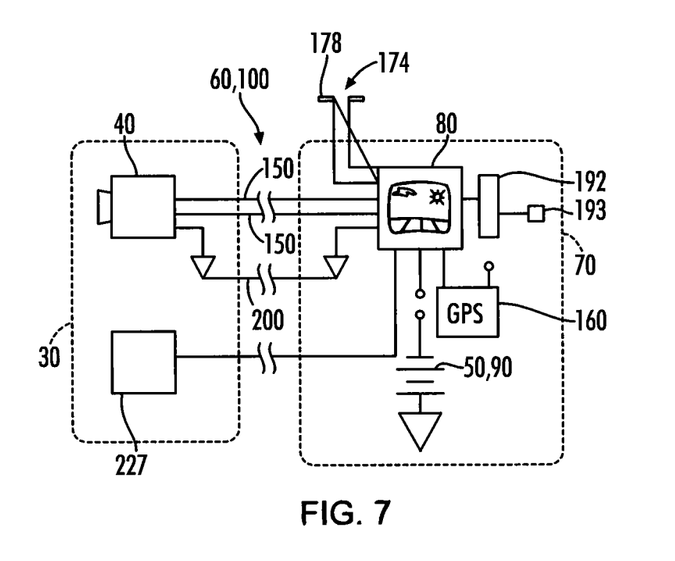
FIG. 7 is a functional block diagram of the second embodiment of the invention.

In a second embodiment of the invention, illustrated in FIGS. 4 and 7, the signaling means 60 of the camera 40 and the signal receiving means 100 of the display unit 70 is at least one conductive cable 150 electrically connecting the camera 40 to the display unit 70. Clearly multiple signal conductors 150 may be utilized depending on the type of camera 40 used and the number of output lines (not shown) thereof. The bicycle 20 itself may be utilized as a ground connector 200, if desired. In such an embodiment, the power source 90 of the display unit 70 may also be used to power the camera 40 through at least one conductive cables 150. A microprocessor 192 is provided to capture parameters related to power output of the rider. A gyroscope may be included as an input device to the microprocessor or integral to the microprocessor to capture slope and the GPS unit may input speed and distance. A gear actuation device 193 may be integrated with at least one shift lever 201 to monitor the gear being used or, alternatively, to shift to a different gear depending on power output of the rider.

Figure 5:
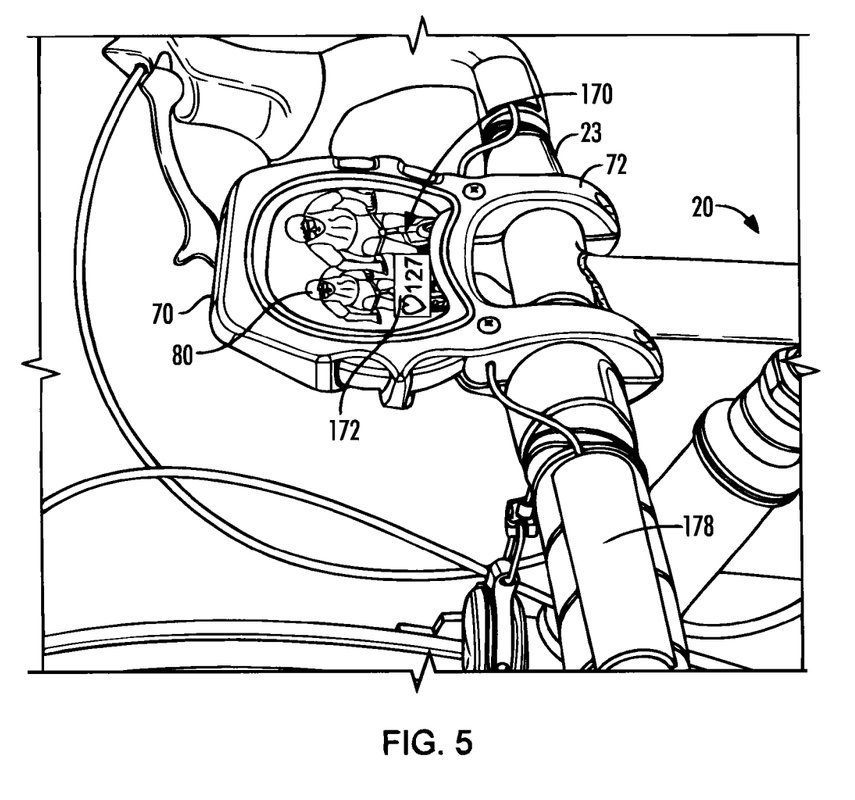
FIG. 5 is a perspective view of the display unit as attached to handlebars of a bicycle.

The display unit 70 may further include a GPS means 160 for displaying GPS location information on the display means 80. Such GPS means 160 are known in the art. Further, a heart rate display means 170 may be incorporated into the display unit 70 (FIGS. 5 and 7). As such, a heart rate indicator 172 may appear on the display means 80, driven by a heart rate detection means 174 such as a pair of heart beat detecting conductors 178 fixed to the handlebars 23 of the bicycle 20. Such heart beat detecting conductors 178 are adapted to make electrical contact with the rider's hands (not shown) to detect the rider's heart beats, and are electrically connected to the heart rate detection means 174. Alternately, the heart rate detection means may be at least one chest strap (not shown) that wirelessly transmits heart rate information to the display unit 70.

While a particular form of the invention has been illustrated and described, it will be apparent that various modifications can be made without departing from the spirit and scope of the invention. Accordingly, it is not intended that the invention be limited, except as by the appended claims.

Providing a stable image on a bicycle is difficult due to the fact that the terrain is typically intended for a motor vehicle with larger wheels and more active shock assemblies. It is particularly preferred that the image be presented in a progressive scanning mode wherein an entire image is replaced with another complete digital image. This provides superior results for the present application over raster scan modes.

An accelerometer is preferably integral to the display unit to record acceleration. An accelerometer measures acceleration which can be input to the microprocessor to calculate various power functions. In a particularly preferred embodiment the accelerometer monitors sudden stops, such as in the case of a collision, and provides a signal related thereto to the microprocessor. Once a collision event is indicated an automatic call to an emergency number, such as 911 in the United States, can be made automatically or automatically if not overridden after an alert. In another embodiment a continuous recording can be collected over a short time duration, such as five minutes, and the recording stopped a certain time after a collision event to facilitate collision reconstruction. A Memsic 2125 Dual Axis Accelerometer, available at Radio Shack, is a representative, non-limiting, accelerometer.

The image obtained by the camera may be captured and stored. In one embodiment the image may be stored for later viewing. In another a short video can be stored, such as the most recent five minutes, for collision reconstruction purposes as set forth above.

The display may provide information gathered by the accelerometer in text format or graphic format.

In a particularly embodiment a vehicle proximity detector 227 may be incorporated into the camera or associated with the camera to detect approaching vehicles. The vehicle proximity detector can be active when the display is either on or off. In a particularly preferred embodiment the vehicle proximity detector can run in a background mode and alert visually or audibly even if the display is off. A vehicle proximity detector can detect an approaching vehicle by ultrasonic, magnetic, capacitance, RF field disturbance, other techniques known for use in such devices or combinations thereof.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The invention claimed is:

1. A display system for a bicycle having a seat post receptacle, a seat, and handlebars, said display system comprising:
   a seat post comprising a lower end adapted for engagement with said seat post receptacle of said bicycle and an upper end adapted for engagement with said seat;
   a camera attached to said seat post and alignable with a longitudinal axis of said bicycle;
   at least one battery contained within said seat post wherein said battery provides power to said camera;
   a transmitter adapted for sending visual scene information from said camera;
   a display unit adapted for engagement with the handlebars of the bicycle wherein said display unit comprising:
   a display;
   a signal receiver for receiving said visual scene information and displaying said visual scene information on said display;
   a microprocessor included in said display unit;
   an accelerometer included in said display unit and in communication with said microprocessor; and,
   a storage device in communication with said microprocessor and included in said display unit for storing said visual scene information where said storage device stores scene information for a predetermined period of time before and after the accelerometer detects a collision event.

2. The display system of claim 1 wherein said camera is integral to said seat post.

3. The display system of claim 1 wherein said display comprises a progressive scan mode.

4. The display system of claim 1 wherein said transmitter sends said visual scene information wirelessly.

5. The display system of claim 1 further comprising a vehicle proximity detector.

6. The display system of claim 1 further comprising a heart rate detector.

7. The display system of claim 1 further comprising an illuminator.

8. The display system of claim 7 wherein said illuminator is an LED.

9. The display system of claim 1 wherein said display comprises gear actuation device.

10. A display system for a bicycle having a seat post receptacle, a seat, and handlebars, said display system comprising:
    a camera attached to said seat post and alignable with a longitudinal axis of said bicycle;
    a transmitter adapted for sending visual scene information from said camera;
    a display unit adapted for engagement with the handlebars of the bicycle wherein said display unit comprising:
    a display;
    a signal receiver for receiving said visual scene information and displaying said visual scene information on said display;
    an accelerometer included in said display unit for detecting a sudden stop such as associated with a collision; and,
    a set of computer readable instructions included in said display unit that, when executed by a microprocessor included in said display unit, stores visual scene information for a period of time prior to and after a sudden stop is detected to facilitate collision reconstruction.

11. The system of claim 10 wherein said set of computer readable instructions include instructions for automatically actuating a transmitter included in said display unit to notify a third party that a sudden stop has been detected.

12. The system of claim 10 wherein said computer readable instructions store five minutes or less of information once a sudden stop is detected.

13. The system of claim 10 including a proximity sensor in electronic communications with said display unit for collecting proximity information and storing said proximity information upon detection of a sudden stop.

14. A display system for a bicycle having a seat post receptacle, a seat, and handlebars said display system comprising:
    a seat post comprising a lower end adapted for engagement with said seat post receptacle of said bicycle and an upper end adapted for engagement with said seat;
    a camera integral to said seat post and alignable with a longitudinal axis of said bicycle;
    at least one battery contained within said seat post wherein said battery provides power to said camera;
    a transmitter adapted for sending visual scene information from said camera;
    a display unit adapted for engagement with the handlebars of the bicycle;
    a display included in said display unit;
    a signal receiver included in the display unit for receiving said visual scene information and displaying said visual scene information on said display;
    an accelerometer in communications with a microprocessor, the microprocessor in communications with the display and said signal receiver; and,
    a storage device for storing said visual scene information in communications with the microprocessor wherein the storage device ceases storing visual scene information when the accelerometer and the microprocessor detects a collision event.

\* \* \* \* \*